US009897006B2

(12) United States Patent
Miranda et al.

(10) Patent No.: US 9,897,006 B2
(45) Date of Patent: Feb. 20, 2018

(54) HOT GAS PATH COMPONENT COOLING SYSTEM HAVING A PARTICLE COLLECTION CHAMBER

(71) Applicant: General Electric Company, Schenectady, NY (US)

(72) Inventors: Carlos Miguel Miranda, Greer, SC (US); Benjamin Paul Lacy, Greer, SC (US)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 14/739,727

(22) Filed: Jun. 15, 2015

(65) Prior Publication Data

US 2016/0363052 A1    Dec. 15, 2016

(51) Int. Cl.
 *F01D 5/18* (2006.01)
 *F02C 7/18* (2006.01)
 (Continued)

(52) U.S. Cl.
 CPC ............... *F02C 7/18* (2013.01); *F01D 5/187* (2013.01); *F01D 5/188* (2013.01); *F02C 3/04* (2013.01);
 (Continued)

(58) Field of Classification Search
 CPC . F01D 5/18; F01D 5/183; F01D 5/184; F01D 5/186; F01D 5/187; F01D 5/188; F01D 5/189; F01D 2240/81; F01D 2260/202; F01D 2260/607; F01D 2330/21; Y02T 50/676
 (Continued)

(56) References Cited

U.S. PATENT DOCUMENTS 4,142,824 A * 3/1979 Andersen ................ F01D 5/187
                                          415/115
4,270,883 A * 6/1981 Corrigan ................ F01D 5/147
                                          415/115
(Continued)

FOREIGN PATENT DOCUMENTS

EP    0 227 580 A2    7/1987
EP    2 381 070 A2   10/2011
(Continued)

OTHER PUBLICATIONS

Extended European Search Report and Opinion issued in connection with related EP Application No. 16173820.8 dated Nov. 11, 2016.
(Continued)

*Primary Examiner* — Matthew W Jellett
(74) *Attorney, Agent, or Firm* — Armstrong Teasdale LLP

(57) ABSTRACT

A cooling system for a hot gas path component includes a substrate having an outer surface and an inner surface. The inner surface defines at least one interior space. A passage is formed in the substrate between the outer surface and the inner surface. An access passage is formed in the substrate and extends from the outer surface to the inner space. The access passage is formed at a first acute angle to the passage and includes a particle collection chamber. The access passage is configured to channel a cooling fluid to the passage. Furthermore, the passage is configured to channel the cooling fluid therethrough to cool the substrate.

18 Claims, 6 Drawing Sheets

(51) Int. Cl.
*F02C 3/04* (2006.01)
*F02C 7/052* (2006.01)

(52) U.S. Cl.
CPC ........ *F02C 7/052* (2013.01); *F05D 2260/202* (2013.01); *F05D 2260/204* (2013.01); *F05D 2260/607* (2013.01); *Y02T 50/672* (2013.01); *Y02T 50/676* (2013.01)

(58) Field of Classification Search
USPC .................................. 415/115, 116; 416/97 A
See application file for complete search history.

(56) References Cited

U.S. PATENT DOCUMENTS

| | | | |
|---|---|---|---|
| 4,526,512 A * | 7/1985 | Hook | F01D 5/188 |
| | | | 415/115 |
| 5,062,768 A * | 11/1991 | Marriage | F01D 5/186 |
| | | | 29/889.721 |
| 5,263,820 A | 11/1993 | Tubbs | |
| 5,640,767 A | 6/1997 | Jackson et al. | |
| 5,660,524 A | 8/1997 | Lee et al. | |
| 6,383,602 B1 | 5/2002 | Fric et al. | |
| 6,896,036 B2 | 5/2005 | Schneiders et al. | |
| 6,921,014 B2 | 7/2005 | Hasz et al. | |
| 6,942,449 B2 | 9/2005 | Boyer | |
| 7,364,405 B2 * | 4/2008 | Cunha | B22C 9/06 |
| | | | 29/889.721 |
| 7,549,844 B2 | 6/2009 | Liang | |
| 7,621,718 B1 | 11/2009 | Liang | |
| 8,070,436 B2 * | 12/2011 | Mitchell | F01D 5/186 |
| | | | 415/115 |
| 8,070,441 B1 | 12/2011 | Liang | |
| 8,167,559 B2 | 5/2012 | Liang | |
| 8,176,720 B2 | 5/2012 | Beeck | |
| 8,317,475 B1 | 11/2012 | Downs | |
| 8,414,263 B1 | 4/2013 | Liang | |
| 8,491,264 B1 | 7/2013 | Liang | |
| 8,561,411 B2 | 10/2013 | DiBenedetto | |
| 8,578,720 B2 | 11/2013 | Ebert et al. | |
| 8,651,805 B2 | 2/2014 | Lacy et al. | |
| 8,807,943 B1 | 8/2014 | Liang | |
| 9,206,696 B2 | 12/2015 | Bunker et al. | |
| 9,435,208 B2 | 9/2016 | Bunker | |
| 9,458,725 B2 | 10/2016 | Morgan et al. | |
| 9,476,306 B2 | 10/2016 | Bunker | |
| 2010/0183428 A1 | 7/2010 | Liang | |
| 2011/0110771 A1 | 5/2011 | Morgan et al. | |
| 2011/0259017 A1 * | 10/2011 | Lacy | F01D 5/186 |
| | | | 60/806 |
| 2012/0111545 A1 | 5/2012 | Bunker et al. | |
| 2012/0124832 A1 | 5/2012 | Bunker et al. | |
| 2012/0255870 A1 | 10/2012 | Rebak et al. | |
| 2012/0276308 A1 | 11/2012 | Rebak et al. | |
| 2012/0328451 A1 | 12/2012 | Lomas et al. | |
| 2013/0086784 A1 | 4/2013 | Bunker | |
| 2013/0101761 A1 | 4/2013 | Bunker et al. | |
| 2014/0004310 A1 | 1/2014 | Rebak et al. | |
| 2014/0110559 A1 | 4/2014 | Lee et al. | |
| 2015/0086408 A1 | 3/2015 | Kottilingam et al. | |
| 2015/0096305 A1 | 4/2015 | Morgan et al. | |
| 2015/0251280 A1 | 9/2015 | Bunker | |
| 2016/0339544 A1 | 11/2016 | Xu et al. | |

FOREIGN PATENT DOCUMENTS

| | | |
|---|---|---|
| EP | 2 518 270 A2 | 10/2012 |
| EP | 2 540 971 A1 | 1/2013 |
| EP | 2 853 323 A2 | 4/2015 |
| GB | 803 650 A | 10/1958 |
| GB | 2 260 166 A | 4/1993 |
| WO | 2015/035363 A1 | 3/2015 |

OTHER PUBLICATIONS

Extended European Search Report and Opinion issued in connection with corresponding EP Application No. 16174145.9 dated Nov. 14, 2016.

Extended European Search Report and Opinion issued in connection with related EP Application No. 16174266.3 dated Nov. 18, 2016.

Extended European Search Report and Opinion issued in connection with related EP Application No. 16174149.1 dated Dec. 6, 2016.

Miranda, et al., U.S. Appl. No. 14/739,791, filed Jun. 15, 2015.
Miranda, et al., U.S. Appl. No. 14/739,849, filed Jun. 15, 2015.
Lacy, et al., U.S. Appl. No. 14/739,944, filed Jun. 15, 2015.

* cited by examiner

HOT GAS PATH COMPONENT COOLING SYSTEM HAVING A PARTICLE COLLECTION CHAMBER

FEDERAL RESEARCH STATEMENT

The subject matter of this disclosure was made with Government support under Contract No. DE-FC26-05NT42643, awarded by the Department of Energy (DOE), and the Government has certain rights in the subject matter claimed herein.

BACKGROUND

The field of the present disclosure relates generally to turbine engines, and more particularly to systems for cooling hot gas path components in turbine engines.

Gas turbine systems are widely utilized in fields such as power generation. A conventional gas turbine system includes a compressor, a combustor, and a turbine. During operation of the gas turbine system, various components in the system are subjected to high temperature flows, which can cause the components to fail. Since higher temperature flows generally result in increased performance, efficiency, and power output of the gas turbine system and are thus desired in a gas turbine system, the components that are subjected to high temperature flows must be cooled to allow the gas turbine system to operate with flows at increased temperatures.

Various strategies are known in the art for cooling components that are subjected to high temperature flows. These components are typically known as hot gas path components. For example, a series of internal cooling passages may be formed in a hot gas path component. A cooling fluid may be provided to the passages from a plenum, and the cooling fluid may flow through the passages, cooling the hot gas path component substrate and coatings. However, the cooling fluid can be contaminated with various types of particles, which can cause blockage of the internal cooling passages, or serpentines formed in the hot gas path component that is cooled with the cooling fluid. Such blockage can shorten the life of these components.

BRIEF DESCRIPTION

In one aspect, a cooling system for a hot gas path component is provided. The cooling system includes a substrate comprising an outer surface and an inner surface. The inner surface defines at least one interior space. The cooling system includes a passage extending between the outer surface and the inner surface of the substrate. Moreover, the cooling system includes an access passage formed in the substrate and extending from the outer surface to the at least one inner space. The access passage is formed at a first acute angle to the passage. In addition, the access passage includes a particle collection chamber. The access passage is configured to channel a cooling fluid to the passage. Furthermore, the passage is configured to channel the cooling fluid therethrough to cool the substrate.

In another aspect, a gas turbine engine is provided. The gas turbine engine includes a compressor, a turbine coupled to the compressor, and a hot gas path component disposed in a least one of the compressor and the turbine. The hot gas path component includes a substrate comprising an outer surface and an inner surface. The inner surface defines at least one interior space. The hot gas path component also includes a passage extending between the outer surface and the inner surface of the substrate. Moreover, the hot gas path component includes an access passage formed in the substrate and extending from the outer surface to the at least one inner space. The access passage is formed at a first acute angle to the passage. The access passage includes a particle collection chamber. The access passage is configured to channel a cooling fluid to the passage. The passage is configured to channel the cooling fluid therethrough to cool the substrate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
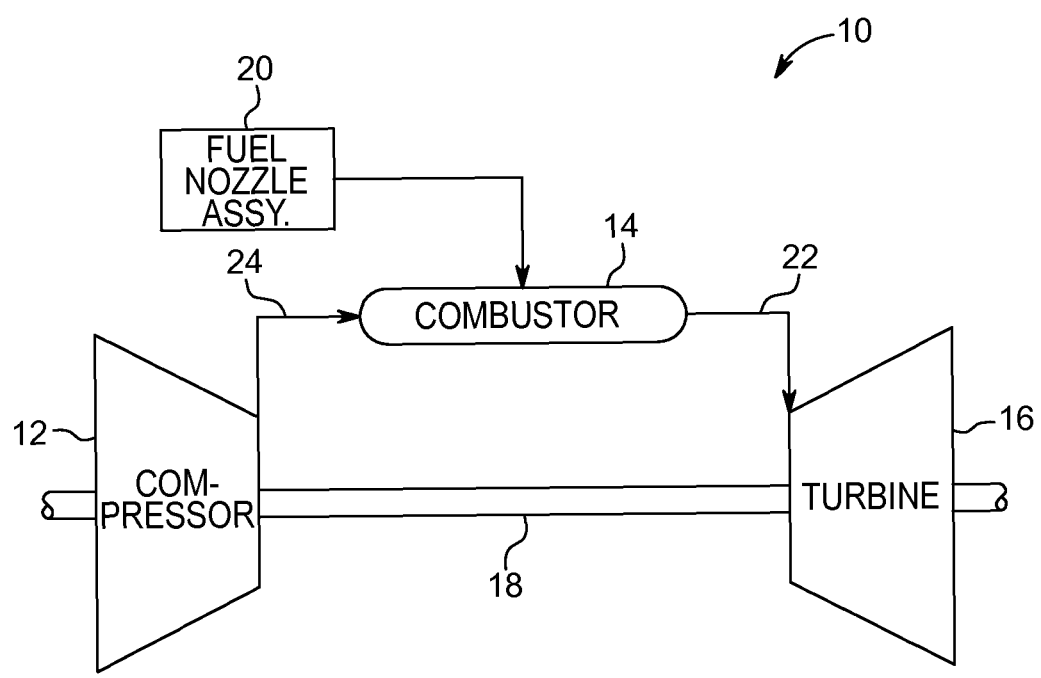
FIG. 1 is a schematic view of an exemplary gas turbine engine.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed vanes or blades (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. In alternative embodiments, rotatable shaft 18 is a plurality of shaft segments coupled together to form rotatable shaft 18. In the exemplary embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
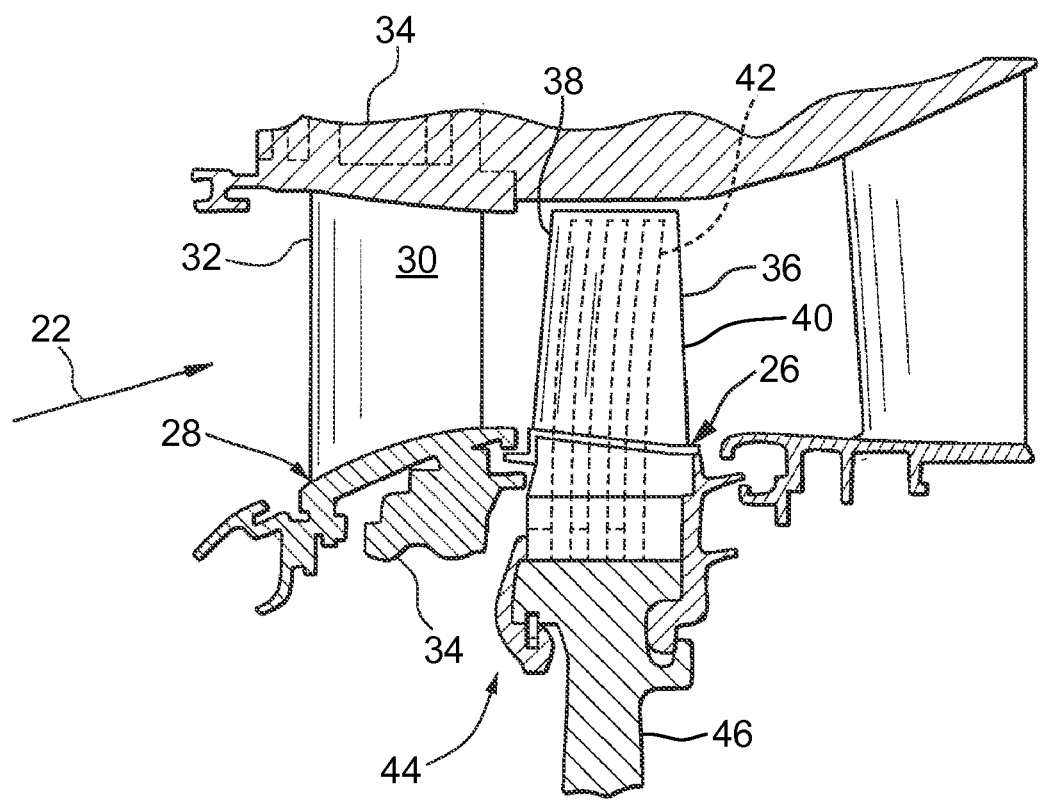
FIG. 2 is a schematic view of a portion of a turbine of the gas turbine engine shown in FIG. 1.

FIG. 2 is a schematic view of a portion of turbine 16 of gas turbine engine 10 shown in FIG. 1. In the exemplary embodiment, turbine 16 includes a hot gas path component such as a turbine blade 26 and a stator vane 28. An airfoil 30 used with stator vane 28 includes a leading edge 32 that is directly exposed to hot gas flow 22. Stator vanes 28 may be cooled by air routed from one or more stages of compressor 12 through a casing 34 of gas turbine engine 10. An airfoil 36 used with hot gas path component 26 includes a leading edge 38 that is directly exposed to hot gas flow 22, and an axially opposite trailing edge 40. Hot gas path component 26 may also be cooled by pressurized air 24 routed from one or more stages of compressor 12 through casing 34 of gas turbine engine 10.

In the exemplary embodiment, pressurized air 24 is described as the cooling fluid used to cool the components exposed to hot gas flow 22, e.g., stator vane 28 and hot gas path component 26. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the exemplary embodiment, at least one cooling system 42 defined in hot gas path component 26 is coupled in flow communication with a cooling fluid supply conduit 44. In the exemplary embodiment, cooling fluid supply conduit 44 is connected to compressor 12.

In operation, gas turbine engine 10 ingests air into compressor 12. Compressor 12, rotating at a high rotational speed compresses or pressurizes the air and channels a portion of pressurized air 24 to combustor 14 and a portion of pressurized air 24 to other areas of gas turbine engine 10 for use in cooling components exposed to heat generated by gas turbine engine 10. Pressurized air 24 is mixed with fuel in combustor 14 and ignited to generate hot gas flow 22. Hot gas flow 22 is channeled from combustor 14 toward turbine 16 where hot gas flow 22 passes over stator vane 28 and impacts hot gas path component 26 connected to a rotor wheel 46. Rotor wheel 46 is rotated by hot gas flow 22 impacting hot gas path component 26. Hot gas flow 22 also transfers heat to stator vane 28 and hot gas path component 26. A portion of pressurized air 24 is channeled through cooling system 42 formed in at least hot gas path component 26 to facilitate cooling the component.

Figure 3:
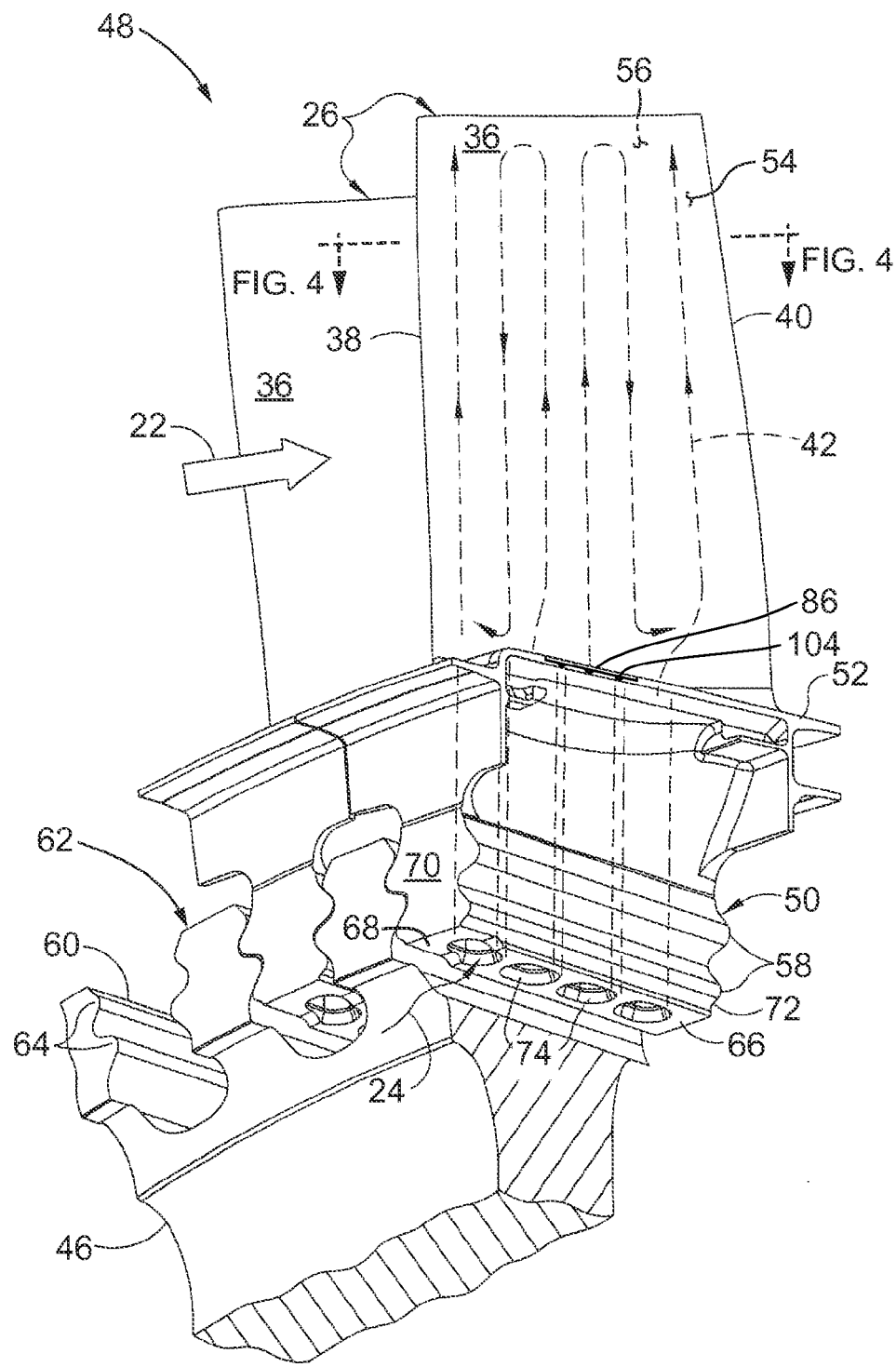
FIG. 3 is a partial isometric sectional view of the gas turbine engine shown in FIG. 1, illustrating a rotor wheel assembly including two hot gas path components coupled to a rotor wheel.

FIG. 3 is a partial isometric sectional view of gas turbine engine 10 illustrating an exemplary rotor wheel assembly 48 and includes two hot gas path components 26 coupled to rotor wheel 46. In the exemplary embodiment, hot gas path component 26 is coupled within turbine 16. Gas turbine engine 10 includes a plurality of hot gas path components 26. While a turbine blade is described herein, a hot gas path component is any component of gas turbine engine 10 that is at least partially exposed to hot gas flow 22 through gas turbine engine 10, e.g., where the hot gas flow 22 operating temperature, in one example, is above 2500 degrees Fahrenheit (° F.) (~1371 degrees Celsius (° C.)). For example, hot gas path component 26 includes, without limitation, bucket assemblies (also known as blades or blade assemblies), nozzle assemblies (also known as vanes or vane assemblies), shroud assemblies, transition pieces, retaining rings, and compressor exhaust components. Hot gas path component 26 is not limited to the examples described above, but is any component that is at least partially exposed to hot gas flow 22. In addition, hot gas path component 26 is not limited to components of gas turbine engine 10, but may be any type of component that is exposed to high temperature flows.

In the exemplary embodiment, airfoil 36 is at least partially hollow and is integrally coupled to a dovetail 50 at a platform 52. Platform 52 defines a portion of a radially inner boundary for hot gas flow 22 within gas turbine engine 10. Airfoil 36 generally includes a concave pressure side 54 extending between leading edge 38 and trailing edge 40, and an opposite, convex, suction side 56. Dovetail 50 includes an upper and lower pair of laterally or circumferentially opposite dovetail tangs 58 that are configured in a typical fir tree arrangement. Dovetail tangs 58 support hot gas path component 26 in a dovetail slot 60 formed in the perimeter of rotor wheel 46. Hot gas path components 26 can be securely coupled to rotor wheel 46 as a dovetail 50 of a respective hot gas path component 26 is inserted into a respective dovetail slot 60. When assembled, hot gas path components 26 form an array of blades that extend circumferentially about the outer periphery of rotor wheel 46. In the exemplary embodiment, each dovetail slot 60 is defined between each pair of circumferentially-spaced rotor wheel posts 62. Dovetail slot 60 includes slot tangs 64 that mate complementarily with turbine blade tangs 58 to provide pressure contact surfaces, through which at least centrifugal loads of hot gas path components 26 are induced into rotor wheel 46.

In the exemplary embodiment, dovetail 50 includes an integral root portion 66 that extends circumferentially between lower dovetail tangs 58. Root portion 66 is an integral extension of lower dovetail tangs 58 and is radially inward of and below tangs 58. Hot gas path component 26 may be fabricated integrally, for example, by casting of a suitable superalloy capable of withstanding the temperatures and stresses generated within turbine 16. In the exemplary embodiment, root portion 66 includes a notch 68 defined adjacent to a forward end wall 70 of dovetail 50. Alternatively, root portion 66 may extend from forward end wall 70 to an opposite aft end wall 72, may include a lip (not shown) that extends radially inward at forward end wall 70, or may be formed in any shape that enables gas turbine engine 10 to operate as described herein. In the exemplary embodiment, root portion 66 facilitates enhancing the structural integrity and strength of dovetail 50.

In the exemplary embodiment, airfoil 36 is a least partially hollow and includes internal cooling system 42. Dovetail 50 includes a plurality of axially-aligned inlet apertures 74 that extend longitudinally through dovetail 50 and that are coupled in flow communication with cooling system 42 formed in airfoil 36. Pressurized air 24 bled from compressor 12 is channeled through dovetail slots 56 and into inlet apertures 74 to provide air 24 through dovetail 50 and into airfoil 36.

Figure 4:
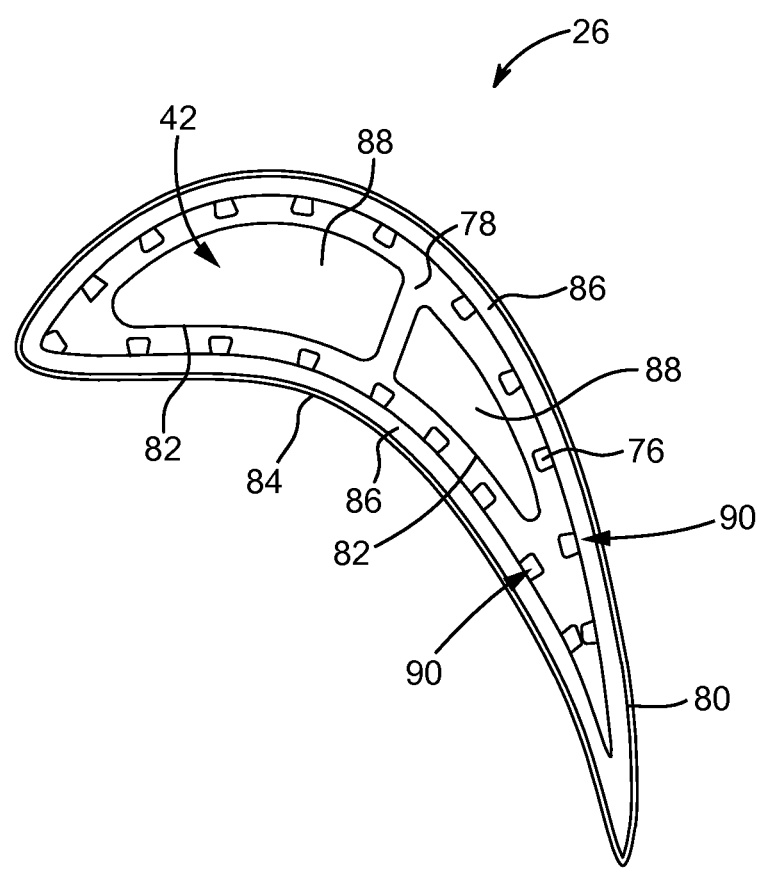
FIG. 4 is a schematic cross-section of the hot gas path component shown in FIG. 3 for use in gas turbine engine of FIG. 1 and including a cooling system formed therein.

FIG. 4 is a schematic cross-section of hot gas path component 26 (shown in FIG. 3) for use in gas turbine engine 10 (shown in FIG. 1) and including cooling system 42 formed therein. When hot gas path component 26 is exposed to a hot gas flow 22, hot gas path component 26 is heated by hot gas flow 22 and can reach a temperature at which hot gas path component 26 may rapidly deteriorate. Cooling system 42 for hot gas path component 26 enables gas turbine engine 10 to function with hot gas flow 22 at an increased temperature, which increases the efficiency and performance of gas turbine engine 10.

In the exemplary embodiment, cooling system 42 includes a series of small passages, or micro-channels 76, formed in a substrate 78. As used herein, "small" or "micro" channel dimensions range between approximately 0.010 inches (in.) (0.25 millimeters (mm)) and approximately 0.100 in. (2.54 mm). Substrate 78 includes an outer surface 80 and an inner surface 82. Micro-channels 76 are formed in outer surface 80 of substrate 78. Hot gas path component 26 includes a coating 84 that may include one or more material layers. In the exemplary embodiment, coating 84 is a thermal barrier coating (TBC). In alternative embodiments, hot gas path component 26 can be formed from a high temperature ceramic matrix composite (CMC) and include an environmental barrier coating (EBC) system that includes one or more layers.

In the exemplary embodiment, hot gas path component 26 also includes one or more covers or braze sheets 86 covering at least a portion of micro-channels 76. Alternatively, hot gas path component 26 is free of braze sheets 86, and micro-channels 76 are formed within hot gas path component 26 or in a surface of hot gas path component 26 to enable coating 84 to cover micro-channels 76 without blocking flow through the micro-channels. In the exemplary embodiment, pressurized air 24 (not shown in FIG. 4) is provided to micro-channels 76 from at least one plenum 88, and pressurized air 24 flows through micro-channels 76 to cool coating 84. In the exemplary embodiment, cooling system 42 utilizes backside convection cooling to supply pressurized air 24 to micro-channels 76, enabling pressurized air 24 to flow through micro-channels 76 to cool coating 84 at an increased heat transfer rate and with a relatively uniform temperature profile.

Substrate 78 is typically cast prior to forming micro-channels 76 in outer surface 80 of substrate 78. Alternatively, micro-channels 76 could be cast in substrate 78 during fabrication. Substrate 78 is formed from any suitable material depending on the intended application for hot gas path component 26, for example, without limitation, Ni-base, Co-base, and Fe-base superalloys and the like. Some Ni-base superalloys are known to be advantageous because of a combination of desirable properties including high temperature strength and high temperature creep resistance. The material used to form substrate 78 may also include a NiAl intermetallic alloy, as these alloys are also known to possess a combination of superior properties including high temperature strength and high temperature creep resistance that are advantageous for use in turbine engine applications used for aircraft. In alternative embodiments, substrate 78 is formed from any material that enables substrate 78 to function as described herein.

In the exemplary embodiment, braze sheets 86 conform to the profile of outer surface 80 and cover micro-channels 76, thereby forming cooling passages 90. Coating 84 extends along at least a portion of outer surface 80 and braze sheets 86 of substrate 78, forming a protective material layer on hot gas path component 26. In one embodiment, coating 84 includes one or more material layers, such as a bondcoat and a TBC. For example, coating 84 may be yttria-stabilized zirconia and may be applied to hot gas path component 26 through a physical vapor deposition process or thermal spray process as described herein. Alternatively, coating 84 may be a ceramic, for example, without limitation, a thin layer of zirconia modified by other refractory oxides such as oxides formed from Group IV, V and VI elements or oxides modified by Lanthanide series elements such as La, Nd, Gd, Yb, and the like. For particular configurations, coating 84 has a thickness in the range of 0.1 to 2.0 millimeters, and more particularly, in the range of 0.1 to 1 millimeter, and still more particularly 0.1 to 0.5 millimeters for industrial gas turbine components. However, other thicknesses may be utilized depending on the requirements for a particular hot gas path component 26.

Coating 84 in deposited onto hot gas path component 26 using a variety of techniques. In one embodiment, coating 84 is disposed over at least a portion of outer surface 80 of substrate 78 by performing an ion plasma deposition. Briefly, ion plasma deposition includes placing a cathode formed of a coating material into a vacuum environment within a vacuum chamber, providing substrate 78 within the vacuum environment, supplying a current to the cathode to form a cathodic arc upon a cathode surface resulting in erosion or evaporation of coating material from the cathode surface, and depositing the coating material from the cathode upon the substrate outer surface 32. In one embodiment, the ion plasma deposition process includes a plasma vapor deposition process. Non-limiting examples of coating 84 include structural coatings, bond coatings, oxidation-resistant coatings, and thermal barrier coatings. In alternative embodiments, coating 84 is disposed over at least a portion of outer surface 80 of substrate 78 by performing a thermal spray process. For example, without limitation, the thermal spray process includes combustion spraying and/or plasma spraying. The combustion spraying process includes high velocity oxygen fuel spraying (HVOF) or high velocity air fuel spraying (HVAF). The plasma spraying process includes atmospheric (such as air or inert gas) plasma spray or low pressure plasma spray (LPPS), which is also known as vacuum plasma spray (VPS). Alternatively, techniques for depositing one or more layers of coating 84 include, without limitation, sputtering, electron beam physical vapor deposition, electroless plating, electroplating, and any other process that enables coating 84 to function as described herein.

Figure 5:
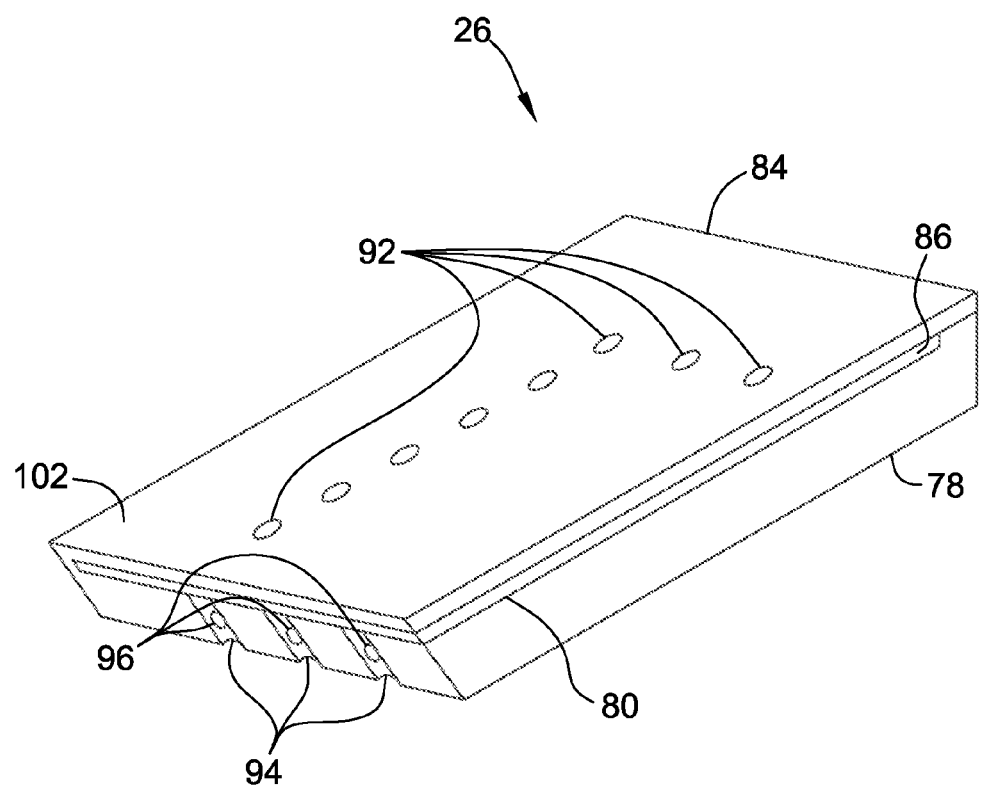
FIG. 5 is a schematic perspective view of a portion of the hot gas path component shown in FIG. 4 illustrating three micro-channels that extend partially along an outer surface of a substrate to channel cooling fluid to respective film cooling holes.
Figure 6:
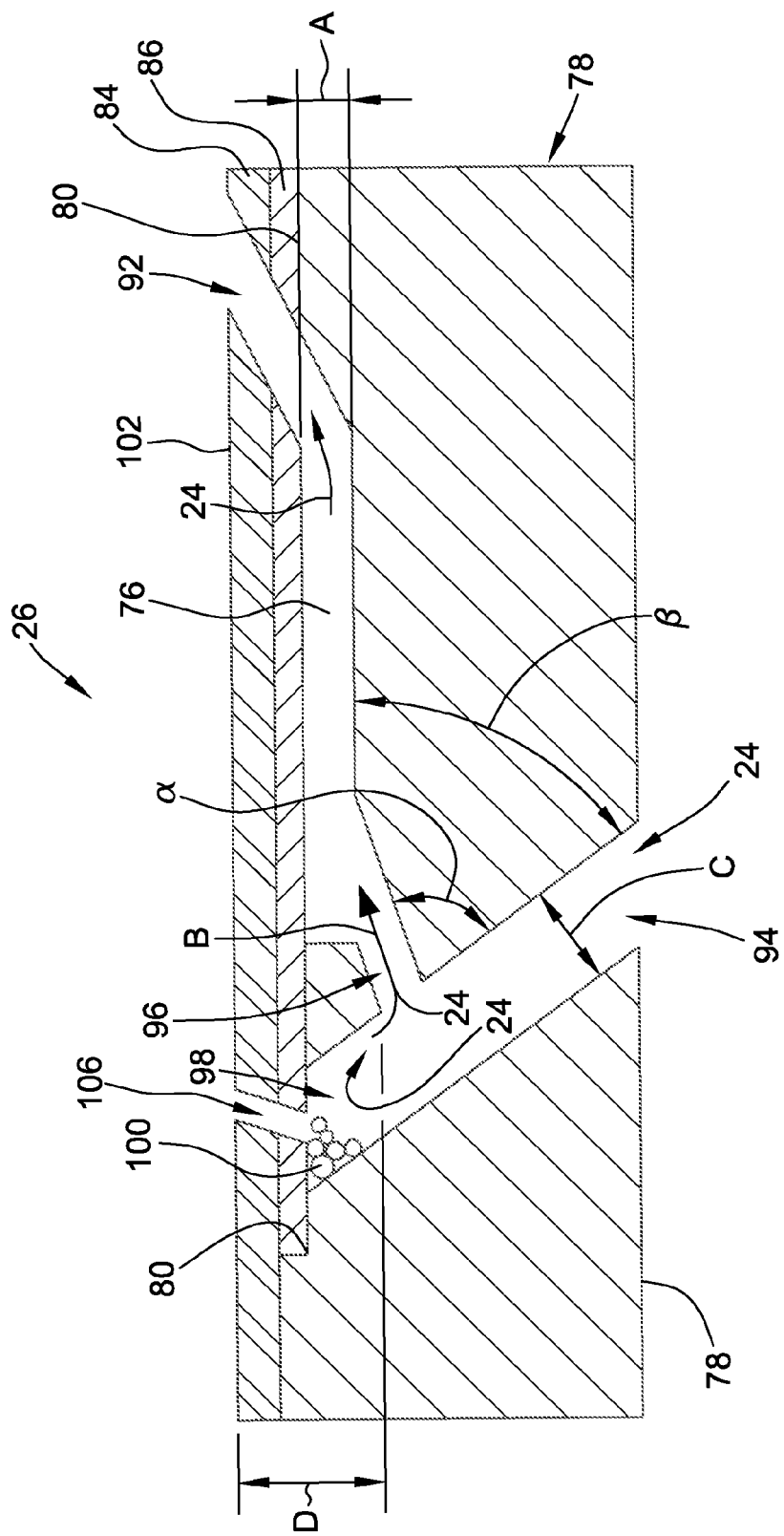
FIG. 6 is a schematic cross-section of one of the micro-channels shown in FIG. 5, illustrating the micro-channel channeling pressurized air from a plenum access passage to a film cooling hole.

FIG. 5 is a schematic perspective view of a portion of hot gas path component 26 shown in FIG. 4 illustrating three micro-channels 76 that extend partially along outer surface 80 of substrate 78 and channel cooling fluid to respective film cooling holes 92. FIG. 6 is a schematic cross-section of one of micro-channels 76 shown in FIG. 5, illustrating micro-channel 76 channeling pressurized air 24 from a plenum access passage 94 to one or more film cooling holes 92. In the exemplary embodiment, micro-channels 76 channel pressurized air 24 from a respective plenum access passage 94 to a respective exiting film cooling hole 92 or exhaust passage. Alternative embodiments, however, do not include film cooling holes 92. In one particular embodiment, as shown with respect to one micro-channel 76 in FIG. 5, more than one film cooling holes 92 is spaced apart along a length of micro-channel 76 thus forming a trench exit micro-channel. In embodiments without cooling holes 92, micro-channels 76 extend along outer surface 80 of substrate 78 and exit off an edge of hot gas path component 26, such as a trailing edge or a bucket tip, or an end wall edge 104 (shown in FIG. 3). In addition, it should be noted that although film cooling holes 92 are shown in FIG. 5 as being round, this is simply a non-limiting example. Film cooling holes 92 may be any shaped hole that enables film cooling holes 92 to function as described herein.

In the exemplary embodiment, micro-channel 76 is formed in outer surface 80 of substrate 78. Plenum access passage 94 extends through substrate 78 from outer surface 80 to inner surface 82 and is formed at an acute angle to micro-channel 76. For example, in the exemplary embodiment, micro-channel 76 is shown as a horizontal and substantially linear channel that is substantially parallel to the edge outer surface 80. Plenum access passage 94 is formed at an angle α with respect to micro-channel 76 such that angle α is less than 90°. Plenum access passage 94 does not intersect micro-channel 76, but rather is connected in fluid communication to micro-channel 76 by a metering passage 96. Furthermore, plenum access passage 94 is formed at an acute angle to metering passage 96. For example, in the exemplary embodiment, metering passage 96 is shown as a substantially linear channel that extends between and fluidly couples plenum access passage 94 to micro-channel 76. Plenum access passage 94 is formed at an angle β with respect to metering passage 96 such that angle β is less than 90°.

In the exemplary embodiment, micro-channel 76, plenum access passage 94, and metering passage 96 may be formed using a variety of techniques. For example, without limitation, techniques for forming these features include laser machining, water jet machining, electro-chemical machining (ECM), electro-discharge machining (EDM), photolithography, or any other process capable of providing channels with proper sizes and tolerances. In one particular embodiment, water jet machining is used and utilizes a high-velocity stream of abrasive particles (e.g., abrasive "grit") suspended in a stream of high pressure water. The pressure of the water varies considerably, but is often in the range of about 35-620 MPa. A number of abrasive materials can be used, such as garnet, aluminum oxide, silicon carbide, and glass beads. The capability of abrasive liquid jet machining techniques facilitates the removal of material in stages to varying depths, with control of the channel shape. For example, without limitation, this process enables plenum access passage 94 and metering passage 96 feeding micro-channel 76 to be drilled either as a straight hole of constant cross section, a shaped hole (elliptical etc.), or a converging or diverging hole. In addition, the abrasive liquid jet system can include a multi-axis computer numerically controlled (CNC) unit. CNC units enable movement of the cutting tool along a number of axes, including X, Y, and Z axes, as well as rotational axes.

In the exemplary embodiment, micro-channel 76 channels pressurized air 24 from plenum access passage 94 to exiting film cooling hole 92. Typically, a length of micro-channel 76 is in the range of 10 to 1000 times a diameter of film cooling hole 92, and more particularly, in the range of 20 to 100 times film cooling hole 92 diameter. Micro-channels 76 can be used anywhere on outer surface 80 of hot gas path component 26. In addition, micro-channels 76 can have any configuration, for example, straight, curved, or have multiple curves.

Micro-channels 76 have a depth A and a width (not shown) in the range between approximately 0.010 inches (in.) (0.25 millimeters (mm)) and approximately 0.100 in. (2.54 mm). Alternatively, micro-channels 76 can have any depth and width that enables micro-channels 76 to function as described herein. In the exemplary embodiment, micro-channels 76 are semicircular and depth A is representative of a radius dimension. In alternative embodiments, micro-channels 76 can have any cross-sectional shape that enables micro-channels 76 to function as described herein, for example, without limitation, square, rectangular, triangular, and semioval shapes. It is contemplated that various micro-channels 76 have cross-sections with a certain geometric shape, while other micro-channels 76 have cross-sections with another geometric shape.

In the exemplary embodiment, micro-channel 76 can be generally straight, or can be generally curved, sinusoidal, or serpentine. Micro-channel 76 can be oriented such that pressurized air 24 flows through micro-channel 76 in any direction with respect to hot gas flow 22. For example, without limitation, pressurized air 24 can flow through micro-channel 76 or any portion thereof in a generally downstream direction with respect to hot gas flow 22, or in a generally upstream direction with respect to hot gas flow 22, or in any other direction with respect to the hot gas flow 22. In some embodiments, micro-channel 76 may be a singular, discrete micro-channel. In other embodiments, micro-channel 76, or any portion of micro-channel 76, may branch off from micro-channel 76 to form multiple micro-channel branches. It is contemplated that micro-channel 76, in some embodiments, wraps around the entire perimeter of hot gas path component 26, or wraps around only portions of the perimeter of hot gas path component 26. However, it is understood that each of micro-channels 76 generally do not intersect with any other micro-channel 76.

In the exemplary embodiment, metering passage 96 extends in fluid communication between an end of micro-channel 76 opposite film cooling hole 92 and plenum access passage 94. As shown in FIG. 6, metering passage 96 intersects plenum access passage 84 at a distance D below outer surface 80 of substrate 78. This facilitates defining a particle collection chamber 98. In the exemplary embodiment, collection chamber 98 is shown between braze sheet 86 and the intersection of metering passage 96. Alternatively, collection chamber 98 is formed between coating 84 or outer surface 80 and the intersection of metering passage 96. In one embodiment, collection chamber 98 includes an exit passage 106 to allow built up particulate 100 to be removed from collection chamber 98. In general, exit passage 106 is smaller in cross-sectional area than micro-channel 76; however, exit passage 106 is any size that enables cooling system 42 to function as described herein. In the exemplary embodiment, metering passage 96 has a cross-sectional width B in the range between approximately 0.025 inches (in.) (0.6 millimeters (mm)) and approximately 0.035 in. (0.9 mm). In the exemplary embodiment, metering passage 96 is circular and width B is representative of a diameter dimension. In alternative embodiments, metering passage 96 can have any cross-sectional shape that enables metering passage 96 to function as described herein, for example, without limitation, square, rectangular, triangular, and semioval shapes. It is contemplated that various metering passages 96 have cross-sections with a certain geometric shape, while other metering passages 96 have cross-sections with another geometric shape.

In the exemplary embodiment, plenum access passage 94 has a cross-sectional width C, which is larger than cross-sectional width B of metering passage 96. In particular, width C is in the range between approximately 0.040 inches (in.) (1.0 millimeters (mm)) and approximately 0.060 in. (1.5 mm). In the exemplary embodiment, plenum access passage 94 is circular and width C is representative of a diameter dimension. Thus, in the exemplary embodiment, a ratio of the diameter of plenum access passage 94 to a diameter of metering hole passage 96 is between about 1.14 and about 2.4. In alternative embodiments, plenum access passage 94 can have any cross-sectional shape that enables plenum access passage 94 to function as described herein, for example, without limitation, square, rectangular, triangular, and semioval shapes. It is contemplated that various plenum access passages 94 have cross-sections with a certain geometric shape, while other plenum access passages 94 have cross-sections with another geometric shape.

As described above, plenum access passage 94 includes particle collection chamber 98. In the exemplary embodiment, particle collection chamber 98 functions to mitigate the potential for micro-channel 76 and film cooling hole 92 blockage. Particulate 100 that is mixed with pressurized air 24 poses a risk of film cooling hole 92 and micro-channel 76 blockage. Such blockage reduces flow through micro-channel 76 or completely obstructs micro-channel 76, thus reducing cooling capability and raising the temperature of hot gas path component 26 above its design limit. Particle collection chamber 98 provides a means of reducing the amount of particulate 100 passing through metering passage 96 in cooling system 42 by modifying the flow path geometry. In one embodiment, collection chamber 98 includes exit passage 106 to enable particulate 100 to be exhausted into hot gas flow 22.

In operation, pressurized air 24 flows through cooling system 42, and in particular, plenum 88, at a pressure generally higher than a pressure in plenum access passage 94, metering passage 96, and micro-channel 76. The pressure differential causes a portion of pressurized air 24 contained within cooling system 42 to flow into and through plenum access passage 94, and from plenum access passage 94 into and through metering passage 96 and micro-channel 76. Because plenum access passage 94 is formed at an acute angle with respect to metering passage 96 and micro-channel 76, pressurized air 24 and any particulate 100 will flow into particle collection chamber 98. The inertia of particulate 100 carries the particulate into particle collection chamber 98 where it is collected and prevented from entering the smaller cross-sectional area metering passage 96 as pressurized air 24 makes a sharp turn into metering passage 96. In addition, in one embodiment, collection chamber 98 includes exit passage 106 such that collected particulate 100 is exhausted into hot gas flow 22.

In the exemplary embodiment, plenum access passage 94 is configured to provide convection cooling to substrate 78 and coating 84. For example, without limitation, plenum access passage 94 is oriented generally at an angle that enables pressurized air 24 to impact on braze sheet 86, substrate 78, or coating 84, thus increasing the cooling effectiveness of pressurized air 24. As pressurized air 24 flows through plenum access passage 94 and is provided to metering passage 96 and micro-channel 76, pressurized air 24 providing cooling of hot gas path component 26. After pressurized air 24 flows through micro-channels 76, cooling coating 84 and outer surface 80 of substrate 78, pressurized air 24 may be exhausted from micro-channels 76. For example, without limitation, in one embodiment as shown in FIGS. 5-6, pressurized air 24 may be exhausted adjacent an outer surface 102 of coating 84. Alternatively, pressurized air 24 may be exhausted off an edge of hot gas path component 26, such as trailing edge 40 or leading edge 38 of airfoil 36, or an end wall edge 104 (shown in FIG. 3) of hot gas path component 26 into the path of hot gas flow 22.

The systems and methods described herein facilitate cooling of a hot gas path component 26 at a high heat transfer rate and with a relatively uniform temperature profile. Thus, the cooling system 42 of the present disclosure may increase the life of hot gas path component 26 and enable hot gas path component 26 to be utilized with higher temperature hot gas flows 22, thus increasing the performance and efficiency of gas turbine engine 10.

The systems described herein are not limited to the specific embodiments described herein. For example, components of each system may be utilized independently and separately from other components described herein. For example, the systems may also be used in combination with other turbine systems, and are not limited to practice only with the gas turbine engines as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A cooling system for a hot gas path component, said cooling system comprising:
   a substrate comprising an outer surface and an inner surface, said inner surface defining at least one interior space;

an outer passage that extends along said outer surface of said substrate;

an access passage formed in said substrate and extending from said outer surface to said at least one inner space, said access passage formed at a first acute angle to said outer passage; and a metering passage extending between said outer passage and said access passage, said metering passage coupling said outer passage in fluid communication with said access passage at an intermediate location along said access passage, wherein said access passage comprises a particle collection chamber between said intermediate location and said outer surface.

2. The cooling system in accordance with claim 1, wherein said metering passage is formed at a second acute angle to said access passage, and wherein said first acute angle is larger than said second acute angle.

3. The cooling system in accordance with claim 1, wherein said metering passage intersects said access passage at a distance below said outer surface of said substrate.

4. The cooling system in accordance with claim 3, wherein said particle collection chamber is defined between said outer surface of said substrate and the intersection distance of said metering passage.

5. The cooling system in accordance with claim 1, wherein said metering passage comprises a first diameter, and said access passage comprises a second diameter larger than said first diameter.

6. The cooling system in accordance with claim 5, wherein a ratio of said second diameter to said first diameter is between 1.14 and 2.4.

7. The cooling system in accordance with claim 5, wherein said metering passage comprises a circular cross-section having a diameter between about 0.025 inches (0.6 mm) and about 0.035 inches (0.9 mm).

8. The cooling system in accordance with claim 5, wherein said access passage comprises a circular cross-section having a diameter between about 0.040 inches (1.0 mm) and about 0.060 inches (1.5 mm).

9. The cooling system in accordance with claim 1 further comprising an exit passage coupled in fluid communication with said particle collection chamber.

10. A gas turbine engine comprising:
a compressor;
a turbine coupled to said compressor; and
a hot gas path component disposed in a least one of said compressor and said turbine, said hot gas path component comprising:

a substrate comprising an outer surface and an inner surface, said inner surface defining at least one interior space;

an outer passage that extends along said outer surface of said substrate;

an access passage formed in said substrate and extending from said outer surface to said at least one inner space, said access passage formed at a first acute angle to said outer passage; and a metering passage extending between said outer passage and said access passage, said metering passage coupling said outer passage in fluid communication with said access passage at an intermediate location along said access passage, wherein said access passage comprises a particle collection chamber between said intermediate location and said outer surface.

11. The gas turbine engine in accordance with claim 10 further comprising a casing comprising a cooling fluid supply conduit.

12. The gas turbine engine in accordance with claim 11, wherein said cooling fluid supply conduit is coupled in fluid communication to said at least one interior space.

13. The gas turbine engine in accordance with claim 10, wherein said hot gas path component further comprises a coating disposed along at least a portion of said outer surface of said substrate.

14. The gas turbine engine in accordance with claim 13 further comprising an exit passage formed through said coating and coupled in fluid communication with said particle collection chamber.

15. The gas turbine engine in accordance with claim 10, wherein said metering passage is formed at a second acute angle to said access passage, and wherein said first acute angle is larger than said second acute angle.

16. The gas turbine engine in accordance with claim 10, wherein said metering passage intersects said access passage at a distance below said outer surface of said substrate.

17. The gas turbine engine in accordance with claim 16, wherein said particle collection chamber is defined between said outer surface of said substrate and the intersection distance of said metering passage.

18. The gas turbine engine in accordance with claim 10, wherein said metering passage comprises a first diameter, and said access passage comprises a second diameter larger than said first diameter.

* * * * *